United States Patent
Tackabury et al.

(10) Patent No.: US 11,882,138 B2
(45) Date of Patent: Jan. 23, 2024

(54) FAST IDENTIFICATION OF OFFENSE AND ATTACK EXECUTION IN NETWORK TRAFFIC PATTERNS

(71) Applicant: International Business Machines Corporation, Armonk, NY (US)

(72) Inventors: Wayne Francis Tackabury, West Tisbury, MA (US); Bruno dos Santos Silva, McKinney, TX (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 16/904,963

(22) Filed: Jun. 18, 2020

(65) Prior Publication Data
US 2021/0400063 A1      Dec. 23, 2021

(51) Int. Cl.
*H04L 9/40*     (2022.01)
*H04L 69/16*    (2022.01)

(52) U.S. Cl.
CPC ...... *H04L 63/1425* (2013.01); *H04L 63/1433* (2013.01); *H04L 69/16* (2013.01)

(58) Field of Classification Search
USPC .......................................................... 726/24
See application file for complete search history.

(56) References Cited

U.S. PATENT DOCUMENTS

| | | | |
|---|---|---|---|
| 9,471,778 B1 | 10/2016 | Seo et al. | |
| 9,842,498 B2 * | 12/2017 | Wang | G08G 1/096791 |
| 10,032,020 B2 | 7/2018 | Reybok et al. | |
| 10,084,803 B2 | 9/2018 | Zheng et al. | |
| 10,129,270 B2 | 11/2018 | Doctor et al. | |
| 10,382,459 B2 * | 8/2019 | Harris | H04L 63/108 |

(Continued)

FOREIGN PATENT DOCUMENTS

| | | | | |
|---|---|---|---|---|
| EP | 2052465 A2 * | 4/2009 | | G06Q 40/04 |
| EP | 3800863 A1 * | 4/2021 | | |

OTHER PUBLICATIONS

Rodrigues, et al. "Cybersecurity and Network Forensics: Analysis of Malicious Traffic Towards a Honeynet with Deep Inspection," Applied Sciences, 2017.

(Continued)

*Primary Examiner* — Sakinah White Taylor
(74) *Attorney, Agent, or Firm* — Michael O'Keefe

(57) ABSTRACT

A method, apparatus and computer system to identify threats on a TCP/IP-based network. The approach leverages a set of reference patterns (or "network spectrals") associated with one or more defined Indicators of Compromise (IoCs). At least one reference pattern is time-bounded and profiles a network traffic pattern using a set of session data (e.g., volume, direction, traffic metadata) that is payload-neutral and may be derived in part by time-series compression of at least one non-varying encoding interval. Network traffic data associated with a traffic pattern under test is received and encoded to generate a test spectral. A stream-based real-time comparison is performed to determine whether the test spectral matches against any of the reference spectrals. Responsive to identifying a match, a given remediation or mitigation action is then taken. A reference spectral may represent a bi- or multi-directional flow, and the multi-directional flow may involve multiple entities.

19 Claims, 7 Drawing Sheets

```
matched = false; i = 0;
while(true) {
    j= 0; m = i;
    while (match_interval(measure[m], spectral[j])) {
        if (j == n(spectral-intervals)) {
            if (m = n(measured-intervals)) {
                matched = true;
                break;
            }
        }
        else if (m == n(measured-intervals)) { // thru spectral space
            break;
        }
        else {
            j++; m++; // continue matching
        }
    }
    if (matched) {
        break;
    } else {
        if (i == n(measured-intervals)) {
            break; // with matched == false
        }
        else {
            i++; // compare spectral against next measure
        }
    }
}
```

(56) References Cited

U.S. PATENT DOCUMENTS

| | | | |
|---|---|---|---|
| 10,404,741 | B2 | 9/2019 | Peteroy et al. |
| 10,432,674 | B1 | 10/2019 | Haugsnes et al. |
| 10,516,693 | B2* | 12/2019 | Stockdale ............ H04L 63/1441 |
| 10,536,249 | B2* | 1/2020 | Papadopoulos ......... H04L 5/005 |
| 2007/0285843 | A1* | 12/2007 | Tran ..................... G11C 13/025 360/245.9 |
| 2016/0065601 | A1* | 3/2016 | Gong .................... H04L 63/145 726/23 |
| 2016/0293172 | A1* | 10/2016 | Sharma ................. G10L 19/018 |
| 2016/0359695 | A1 | 12/2016 | Yadav et al. |
| 2020/0053111 | A1* | 2/2020 | Jakobsson ........... H04L 63/1416 |

OTHER PUBLICATIONS

Garringer, et al, "The Role of Protocol Analysis in Cybersecurity: Closing the Gap on Undetected Data Breaches," Master's Thesis, ProQuest, Dec. 2018.

Anonymous, "Asynchronous Intrusion Detection & Remediation: System and Method for Asynchronous Detection & Remediation of Zero-Day Attacks," IPCOM000238564D, Dec. 3, 2014.

Anonymous, "Modeling and Regenerating Volumetric Distributed Denial of Service (DDos) Attacks by Replicating Observed Traffic Patterns in Production Networks," IPCOM000256645D, Dec. 18, 2014.

Anonymous, "Using Deep Learning on Rule-Based Malicious Traffic Detectors to Generate New Malicious-Like Traffic for Layer 4-7 Testing," IPCOM000256739D, Dec. 26, 2018.

Grill, "Detecting Malicious Network Behavior Using Only TCP Flag Information," IPCOM000238173D, Aug. 6, 2014.

Tahghighi, et al, "Accelerate pattern recognition for cyber security analysis," Proceedings of the 24th Asia and South Pacific Design Automation Conference, Tokyo, Jan. 2019.

Chen, et al, "Spectral Analysis of TCP Flows for Defense against Reduction-of-Quality Attacks," IEEE, 2007.

Novakov, Master's Thesis, "Combining Statistical and Spectral Analysis Techniques in Network Traffic Anomaly Detection," 2012.

Chen, et al., "Collaborative detection and filtering of shrew DDoS attacks using spectral analysis," Journal of Parallel Distributed Computing 66 (2006).

\* cited by examiner

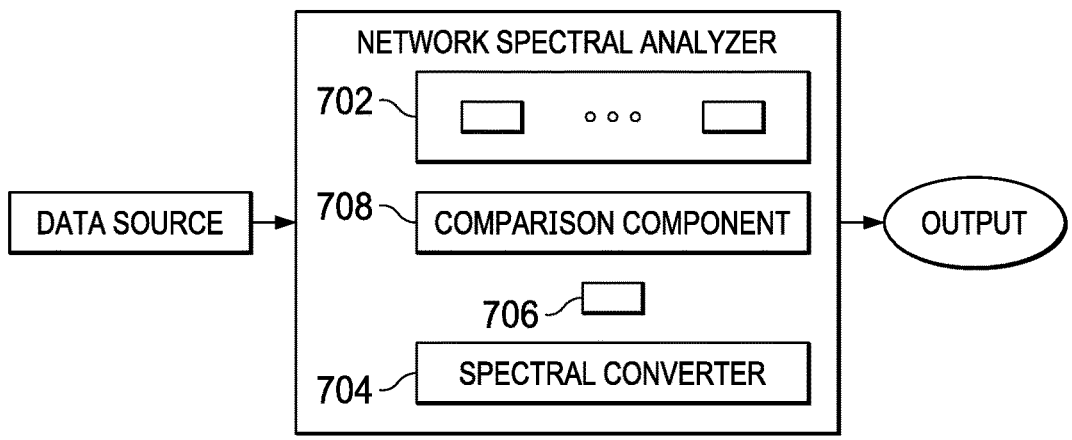

FIG. 7

```
matched = false; i = 0;
while(true) {
        j= 0; m = i;
        while (match_interval(measure[m], spectral[j]) {
                if (j == n(spectral-intervals)) {
                        if (m = n(measured-intervals)) {
                                matched = true;
                                break;
                        }
                }
                else if (m == n(measured-intervals)) { // thru spectral space
                        break;
                }
                else {
                        j++; m++; // continue matching
                }
        }
        if (matched) {
                break;
        } else {
                if (i == n(measured-intervals)) {
                        break; // with matched == false
                }
                else {
                        i++; // compare spectral against next measure
                }
        }
}
```

FIG. 8

FAST IDENTIFICATION OF OFFENSE AND ATTACK EXECUTION IN NETWORK TRAFFIC PATTERNS

BACKGROUND

Technical Field

This disclosure relates generally to network security and, in particular, to tools and techniques that provide characterization of various network threats and attacks that occur on data networks (e.g., TCP/IP networks).

Background of the Related Art

With respect to instrumentation for network cybersecurity positioning or for other applications such as traffic engineering, networks are often in a position to be monitored either by promiscuous mode (receive-all) network taps, or by receiving exported network summary information from multiport switches or other network forwarding devices that provide flow data of varying degrees of verbosity or simplicity. When application of this network traffic data is targeted at cybersecurity analysis, there are several ways which the data may be used. A first use case is forensics collection, wherein raw packet data is collected for sorting, indexing, and analytics in a post attack-incident timeframe. Another use case is real-time attack detection, which involves detecting combinations of network flow metadata such as source address information, signatures of application data embedded in network traffic (e.g., malware), and other patterns known (via threat intelligence sources) to be indicative of a certain type of known attack. Although a rich product space has grown around these two paths, both approaches have limitations.

In particular, and regarding forensics collection, the approach is by definition post-incident, and thus it is only usable when cyber-threat specialists (e.g., in a Security Operations Center (SOC)) have the skills and time to identify past actual traffic for postmortem or evidentiary collection. Real-time attack detection can incur significant processing overhead, and a fully-utilized data center network backbone can easily overwhelm the point of packet capture and/or flow analysis. Indeed, even where devices can be dedicated to this function, CPU loads for flow analytics often undermine scalability. And, where such processing occurs in the traffic flow (e.g., in a switch), the job implementing the function is assigned lower priority to the primary job of that device (zero-loss packet forwarding), thereby potentially impacting performance.

A further impediment to the analysis of application traffic is the fact that, without significant operational investment and policies considered highly intrusive outside of highly secure sites, encrypted traffic is opaque to this kind of analysis. With the entire Internet traffic mix currently reflecting a significant HTTPS traffic balance, this becomes a necessary hurdle to surmount for any realistic volume or efficacy of traffic analysis.

Known mechanisms to address these deficiencies include the use of network web proxies, as well as HTTPS key escrow. Both approaches impose significant operational overhead. For example, proxying traffic is an expensive operation in terms of store and forward processing cycles, primarily because each transmission must be re-encrypted at the forwarding point. Key escrow systems, which providing additional security protections, typically are only deployable at mutually-respected secure enterprise network sites; otherwise, providers may incur liability for degrading integrity of secure user traffic. There remains a need in the art to provide new approaches to detecting malware and other network threats, preferably in near real-time, and irrespective of whether the payloads are in the clear or encrypted.

BRIEF SUMMARY

A method, apparatus and computer system to identify threats on a TCP/IP-based network. The approach leverages a set of reference "network spectral" patterns associated with one or more defined Indicators of Compromise (IoCs). A network spectral is an encoding of a packet capture. Typically, a network spectral contains a set of interval-bound traffic rate measurements for each pairing of addressable network interfaces in that captured traffic, data identifying a duration of the measurement interval, directionality data, other detectable metadata such as source and destination parties, IP bearer and application protocols, and optionally summary flow metadata on measurement entropy. Thus, a network spectral typically profiles a network traffic pattern between or among two or multiple parties using a set of session data that is payload-neutral. If traffic is idle (non-varying) during one or more intervals being encoded into the network spectral, time-series compression may be selectively applied to reduce the amount of data encoded, thereby providing a more compact representation. Preferably, a library of network spectrals of this type are generated and made available for evaluation.

To that end, network traffic data associated with a traffic pattern under test is then received and encoded into a test network spectral. A real-time comparison is then performed to determine whether the test network spectral matches against any of the reference network spectrals. Preferably, this comparison is done in a continuous streaming manner, with each of a set of reference network spectrals being identified initially as a match candidate. As confidence for a given match between the test network spectral and a given reference network spectral declines below a configurable threshold, the reference network spectral is removed from the set. The process then continues until at least one match candidate remains. In response to identifying the at least one match candidate, the system then takes a given remediation or mitigation action. As one example use case, the reference network spectrals depict a set of traffic patterns on which to alert; once the match candidate has been found, the system then provides an indication to a SIEM or other network security device or system that the match has been found.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 7 depicts a network spectral analysis technique of this disclosure;

FIG. 8 is a representative pseudocode listing for a spectral pattern matching routine;

DETAILED DESCRIPTION OF AN ILLUSTRATIVE EMBODIMENT

Figure 1:
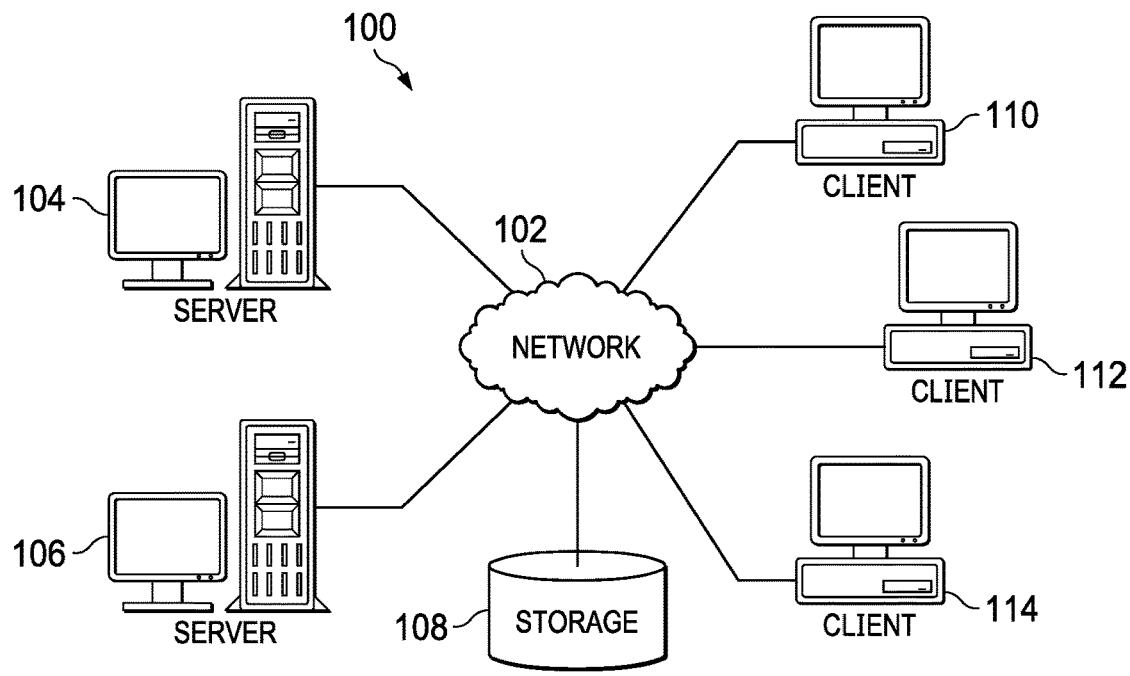
FIG. 1 depicts an exemplary block diagram of a distributed data processing environment in which exemplary aspects of the illustrative embodiments may be implemented.
Figure 2:
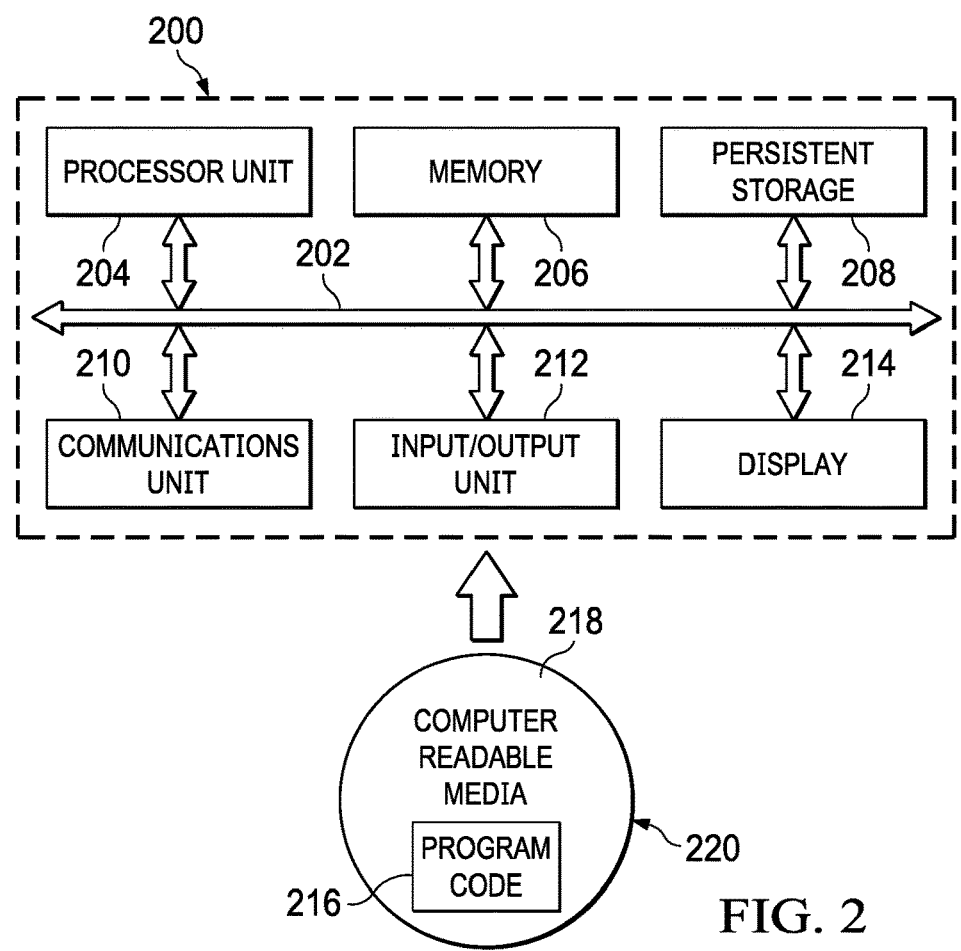
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® STEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact.

Network transactions typically consist of a series of multiple packets between a server and client. With the prevalence of security monitoring and the use of SIEMs, many entities are choosing to collect this flow information to detect cyber-threats. With the ever-increasing amounts of traffic on the network, the need for mechanisms that allow the quick correlation of disparate records is becoming increasingly important. One such view that is useful in security operations is the ability to see what happened in a particular flow session. Current mechanisms of defining and querying for flows in a given flow session, however, typically are tightly-coupled to knowledge about which flow collector saw the traffic, which protocol was used, and which flow fields were present. For example, correlation may be required between two different network flow collectors that are seeing different halves of the same session (i.e. asymmetric routing and recombination), or a correlation may be required between a network flow collector and an event log collector.

Figure 3:
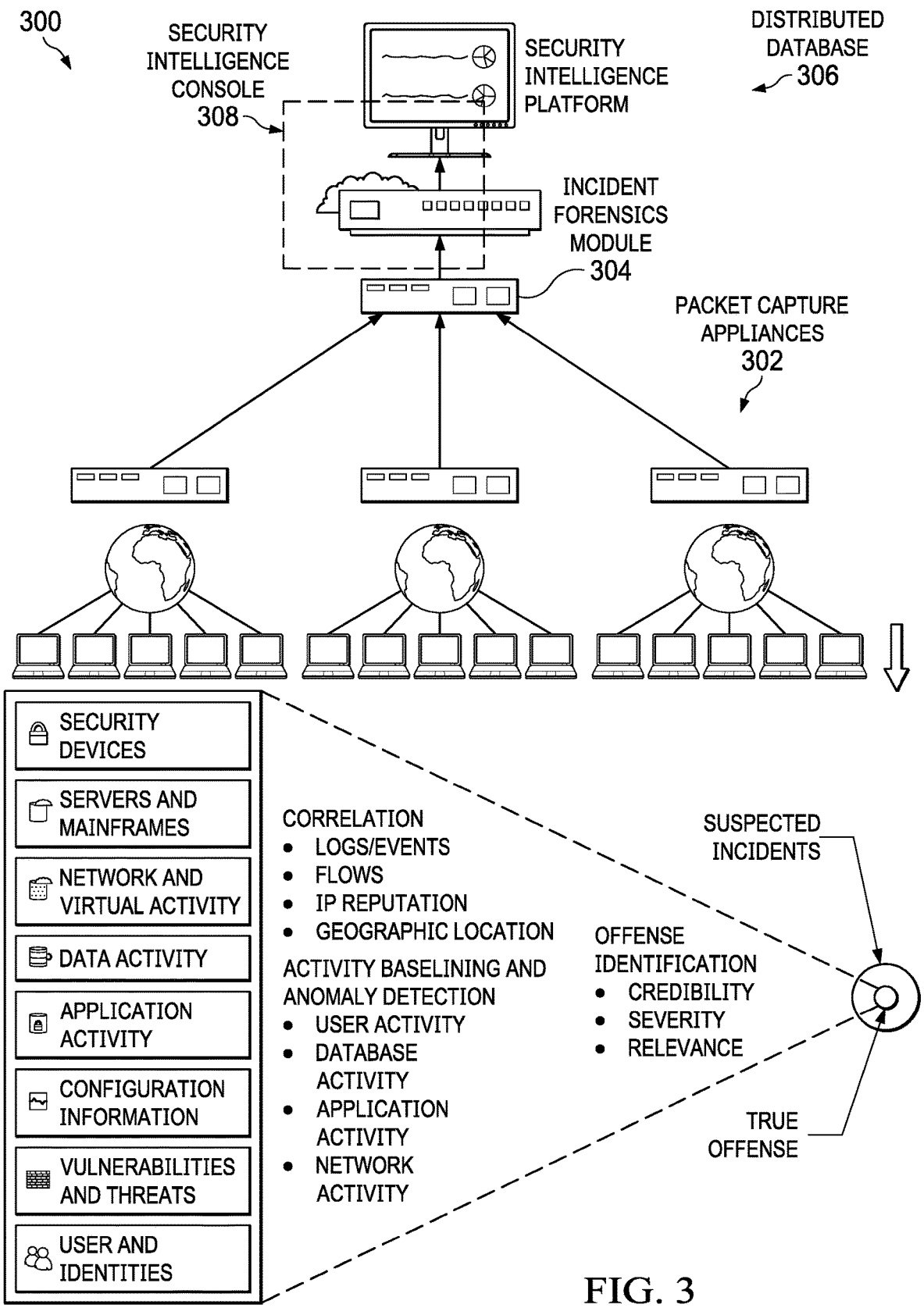
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics. Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. Known entities or persons that are found in the network traffic and documents are automatically tagged. The forensics incident module 304 is operative to correlate tagged identifiers that interacted with each other. Typically, the collection relationships represent a continuously-collected electronic presence that is associated with an attacker, or a network-related entity.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Thus, in the approach, details of an offense are extracted from a STEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

Figure 4:
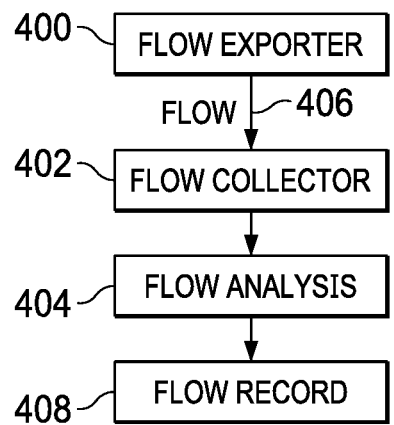
FIG. 4 depicts a network flow data collection system in which the technique of this disclosure may be implemented.

There are many different types of network flow collectors, and often collectors are specific to a particular network flow protocol. An example is IPFIX, and another is NetFlow, is the latter being a router-based feature that provides the ability to collect Internet Protocol (IP) network traffic as it enters or exits a router interface. By analyzing data collected from such tools, a network administrator can identify source and destination of traffic, class of service, and causes of congestion. As depicted in FIG. 4, a typical flow monitoring setup comprises a flow exporter 400, which aggregates packets in to flows and exports flow records toward one or more collectors, a flow collector 402, which receives, stores and pre-processes the flow data received from a flow exporter, and an analysis application 404, which analyzes received flow data, e.g., for intrusion detection or traffic profiling. Typically, a flow 406 is defined as a unidirectional sequence of packets that all share the following values: ingress interface, source IP address, destination IP address, IP protocol, source port for UDP/TCP (0 for other protocols), destination port for UDP/TCP (or type and code for ICMP, or 0 for other protocols), and type of service. As depicted in FIG. 4, a data record 408 can contain a wide variety of information about the traffic in a given flow, e.g., input interface index used by SNMP, output interface index (or zero if the packet is dropped), timestamps for the flow start and finish time (typically in milliseconds since a last boot), number of bytes and packets observed in the flow, Layer 3 headers (source and destination IP addresses, ICMP type and code, IP protocol, Type of Service (ToS) value), source and destination port numbers for TCP, UDP, SCTP, for TCP flows, a union of all TCP flags observed over the life of the flow, Layer 3 routing information (e.g., IP address of an immediate next-hop along a route to the destination), and source and destination IP masks (prefix lengths in the CIDR notation).

There are many other types of network flow export protocols and associated collector mechanisms. Another example is sFlow (short for "sampled flow"), which is an industry standard for packet export at OSI Layer 2. It provides a means for exporting truncated packets, together with interface counters for the purpose of network monitoring. Other examples include IPFIX, as previously noted. Each of the flow export protocols produces flow records. As will now be described, the technique of this disclosure works with any network flow export protocol irrespective of the nature and semantics of the flow records generated.

The above-described packet and network flow capture techniques are representative of the various operating environments in which the techniques of this disclosure may be implemented. As will be described, the fast identification and detection approach herein may be carried out using different data sources (real-time records of network activity) including, without limitation, actual packet captures, where packets are accompanied by microsecond (if not nanosecond) accuracy for recording packet arrival times, and exported network flows, wherein packet counts, packet sizes and other data (e.g., interframe gaps, which are periods of silence between the moment a source sends a data packet across a network and the time that a destination responds) are collected as a part of the exported flow data.

For network data to be propagated to a process doing any kind of analytics, there must be a fixed time period where network data is collected and packaged (e.g., in the case of packet capture, ubiquitously in PCAP form and in the case of network flows, as IPFIX messages sent from the exporting process or device). In the context of the remainder of this disclosure, this fixed time period is referred to as a "collection interval." More generally, in network traffic analysis the collection interval represents an overall collection and reporting unit of interest, e.g., how the flow exporter frames its overall data. As will be seen, the presence and tuning for this interval may be a factor in balancing throughput and real-time effectiveness of the analytics described herein.

Fast Identification of Offense and Attack Execution in Network Traffic Patterns

With the above as background, the technique of this disclosure is now described. According to one aspect, the traffic flows of interest, which include both the traffic under test, as well as a set of candidate traffic flows to which the system attempts to match that test traffic, are encoded into a representational format. As noted above, this format is referred to herein as a "network spectral." The motivation for this approach is the recognition that network traffic itself has conceptual similarities to the colors of the visible light spectrum and its spectral representations. Thus, while visual spectral conveys such characteristics or properties such as magnitude, hue, pigmentation and the like, in a similar manner the approach herein encodes a set of characteristics or properties of the network traffic. The nature and type of these characteristics/properties may vary but typically include volume, protocol identification, directionality, non-encrypted traffic metadata (e.g., TCP protocol and port equivalencies). For example, and assuming a reference pattern of reasonably fine-grained collection intervals, and irrespective of actual traffic payload and content, the network spectral for a given flow may be derived simply based upon quantized IP traffic volume (or lack thereof in inter-frame transmission), multiparty direction, and other detectable metadata (such as IP bearer protocol, namely TCP, UDP, ICMP, GGP, etc.). That pattern (the network spectral) may be multi-dimensional or simply replicated amongst the number of nodes identified in any aggregated flow set. Further, and as will be described, this approach may be used in a simple two-party case (e.g., a flow across two endpoints) but also in the case where multiple parties are involved in the traffic flow.

More formally, a network spectral is an encoding of a packet capture. Typically, a network spectral contains a set of interval-bound traffic rate measurements for each pairing of addressable network interfaces in that captured traffic, data identifying a duration of the measurement interval, directionality data, other detectable metadata such as source and destination parties, IP bearer and application protocols, and optionally summary flow metadata on measurement entropy. Given this encoding, a network spectral typically profiles a network traffic pattern between or among two or multiple parties using a set of session data that is payload-neutral. If traffic is idle (non-varying) during one or more intervals being encoded into the network spectral, and as will be described below, time-series compression may be selectively applied to reduce the amount of data encoded, thereby providing a more compact representation.

Figure 5:
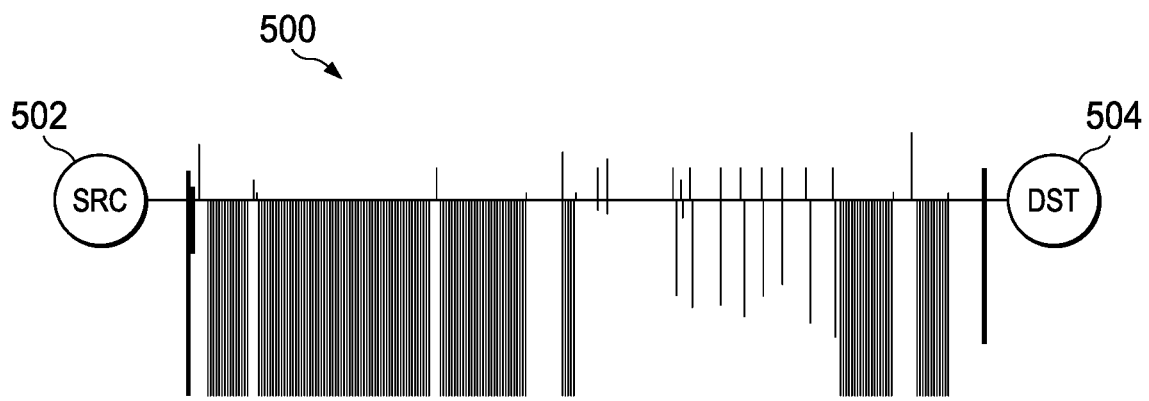
FIG. 5 depicts a representative network spectral depicting an HTTPS-based traffic flow.

FIG. 5 depicts an example network spectral 500 for a simple two party traffic flow between a source 502, and a destination 504. These entities may be computing systems such as depicted in FIG. 2, operating in a client-server relationship as depicted in FIG. 1. As seen in FIG. 5, this visual representation depicts the traffic flows over the duration of a normal HTTP session with the "Connection: keep-alive" header present in the original HTTP request. Although no two sessions of this type are exactly the same, there are certain expected patterns here. In particular, the volume of request-focused traffic (above the line) is heavily outweighed by the response traffic (below). As also evident, initial responses (on the left) form the overwhelming bulk of the transfer with smaller requests to follow (e.g., paralleling the retrieval of a multimedia content page followed by embedded retrieval of banner ads, one-pixel advertiser tracking mechanisms and the like). In this depiction, there are two different identified protocols: TCP control traffic, and TCP session traffic (bold lines). As can be seen, the network spectral for this flow conveys a significant amount of information about the session overall, but also without any need for content (payload) analysis (e.g., by a security analyst). Thus, if this example flow were an HTTPS protocol session, it is analyzed using the network spectral approach of this disclosure while avoiding administratively-intrusive approaches, such as key escrow at the traffic monitoring point, or use of specific decryption devices, and the like.

Figure 6:
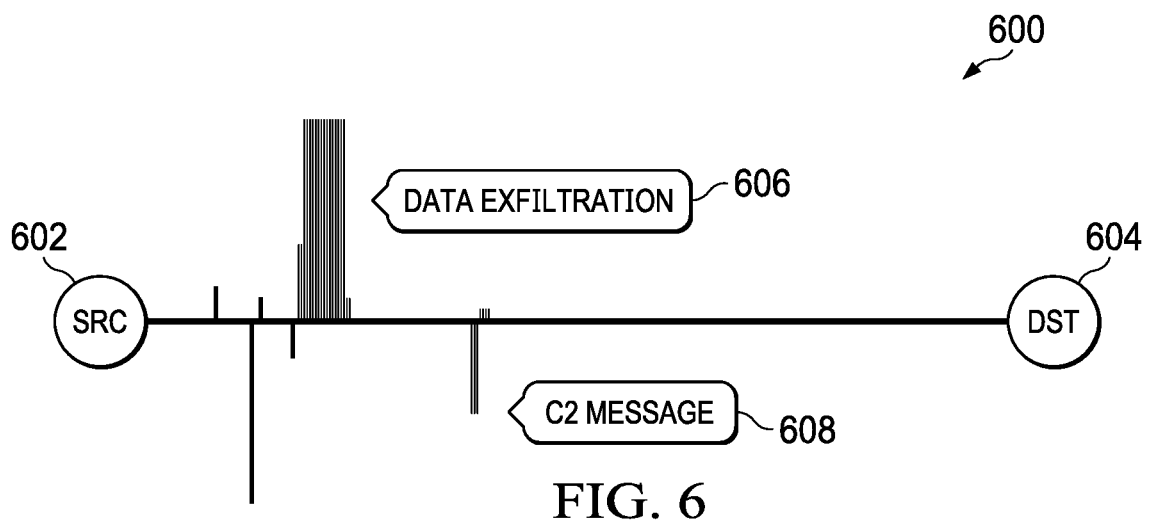
FIG. 6 depicts another representative network spectral depict a malware bot.

FIG. 6 depicts another example network spectral 600, in this case a pattern that is characteristic of a potential security incident. Once again, this is a two-party flow between a source 602, and a destination 604. In this example, the bold lines represent a certificate exchange, and transport control traffic. The data exfiltration is shown by reference numeral 606, and the command and control traffic is shown at 608. This network spectral thus is a graphical pattern representative of a malware bot. As in the previous example, the network spectral provides significant information even though the traffic is anonymized and there is no content transparency. Instead, the relevant information is obtained from the available data, namely, volume and direction of the data, TCP packet header information, alternate protocol exchanges (e.g., X.509), and the like, and this information is identified as being closely characteristic of a malware-borne exchange. Continuing with the visual spectral analogy, in this example these available data elements are like the various colors or color characteristics that together form the visual representation.

The representations such as illustrated in FIGS. 5 and 6 are examples of reference network spectrals. Representations such as these may be grouped together, e.g., into a family of spectrals associated with a more generalized Indicator of Compromise (IoC), in which case the spectrals may also have associated "confidence" values (or other prioritization) that reflect a determination of their relative potential to indicate the IoC of interest.

Generalizing, the various data elements that comprise a traffic flow of interest and, in particular, a traffic segment being analyzed, are sometimes referred to herein as dimensions. Depending on the nature and type of flow, as well as the number of flow participants, the dimensions that comprise a network spectral may vary, but typically they are payload-neutral and defined at the level of session traffic. The boundaries of a session are defined by a flow five-tuple, namely, source IP address, destination IP address, source port, source destination, and protocol. These are relevant dimensions that may be included in the encoding. Others include, without limitation, byte counts (volume), packet counts, sequencing of byte count, packet count paired observations, direction, non-encrypted traffic metadata (e.g., TCP protocol and port equivalencies), and the like. As noted above, a given network spectral may be based on a bi-directional network traffic pattern, a multi-directional network traffic pattern, or combinations thereof, with the patterns generally based upon connection establishment and tear-down signatures for connections (typically TCP transport connections) transmitting those patterns across an underlying IP network fabric. As will be seen, and using the network spectral approach, a traffic segment of interest may be analyzed against a set of reference patterns, which are encoded (typically in an off-line process) to represent the occurrence of network threats and/or other high value events in the network indicative of potential security offenses or attacks. This analysis may be carried in real-time or substantially real-time, thereby enabling "fast identification" of security or other threats associated with the traffic segment. In one example (and non-limiting) embodiment, the network spectral comparison set provides very fast execution HiVE (High Value Event) qualification of network events at a customer premises network.

FIG. 7 depicts a conceptual view of the basic network spectral capture and evaluation technique of this disclosure. As depicted, and in this example embodiment, the functionality is implemented in a network spectral analyzer 700, which may be packaged as a standalone application, library layer or other processing capability (including, without limitation, in a native PCAP application such as Wireshark). The analyzer 700 includes or has the capability to access a set (library) of reference network spectrals 702. Traffic under test (e.g., a PCAP stream) is captured and encoded into a network spectral by a spectral converter component 704. Traffic under test is sometimes referred to herein as traffic under analysis, or test traffic. The encoding used to create the reference network spectrals may differ from the encoding used to encode the traffic under test, or the encoding techniques may be the same. The output of converter component 704 is a network spectral 706, which is then compared to the reference network spectrals in a comparison component 708, which provides spectral pattern matching. Preferably, comparison component 708 works in a continuous streaming manner, with each reference network spectral (of some given number of such reference spectrals) being deemed a match. As the matching process proceeds, the comparison component 708 generates an output 710 indicating a degree of overlap between the captured traffic and one or more reference network spectrals. When the confidence for a given match between the test network spectral and a given reference network spectral declines such that the reference network spectral is no longer considered a (potential) match; that reference network spectral is then removed from further consideration. The matching process then continues until at least one match candidate remains. Based on the pattern matching, the system then characterizes the traffic under test, possibly taken a given remediation or mitigation action as necessary if the flow (as represented by the matched reference network spectral) is suspicious. Although in the usual case one or more reference network spectrals are found to match the traffic under test, there may also be circumstances where no match candidate remains from the pattern matching. In such case, the system returns an indication that the traffic under test either is indeterminate or not recognized.

Generalizing, the network spectral evaluation (traffic under test encoding, and pattern matching) is carried out by a system (typically a software system) that is fed either captured packet traffic (e.g., a PCAP file) or data derived from live captured traffic (e.g., IPFIX messages).

The following section provides additional details regarding an implementation of the above-described approach.

Monitoring Traffic, Patterns and Flows

As used herein, and as depicted in FIG. 7, one or more reference spectrals ($s_{ref}$) are compared to a traffic segment being evaluated ($s_{eval}$). In a typical use case, the network spectral analyzer takes into account the information encoded into the network spectral, e.g. one or more traffic flow dimensions, e.g., packet counts, byte counts, and network traffic metadata (e.g., primary IP bearer protocol, source/destination ports) across the observed traffic patterns as samples over a given collection interval. For any given time-bounded interval (e.g., every five (5) seconds) a formalized analysis of the comparison is depicted by the equation:

$$\prod_0^n i \left( \in M \cup M' = f(\text{interval}^i, M'_{(i-1)}) = \sum_{j=0}^n m(j)[i] \right)$$

This equation, which represents a formula m for matching all candidate reference network spectrals, is executed across a matching interval i. Formally, the matching interval typically represents some specific subdivision within (and before the end of) the collection interval. The matching interval typically is an integral number of encoding intervals. An encoding interval is the smallest duration within a collection interval to qualify and infer the presence and match of an IoC, as depicted in a reference network spectral, to the same matching interval for the traffic under analysis. The encoding interval is the atomic duration-unit of comparison. Preferably, the formula depicted above is iteratively executed across all matching intervals in a match space (in a PCAP or across the current boundary of captured traffic), with each iteration yielding a set of matched spectrals, and a set of partially-matched spectrals, M' where M'∋ ($s_x$, $o_{sx}$) is a coupling of the identification of a spectral (partially-matched), and an encoding of an offset into that spectral where the match has been identified to the end of a matching interval. In the stream-based pattern matching, at the start of any match at a matching interval 0, preferably all possible reference spectrals are viable match candidates (i.e., none have been eliminated). As traffic is evaluated on a matching interval, the system takes into account current match candidates from their offset 0.

Confidence Interval Weighting

As described above, during the stream-based pattern matching, the encoding of the traffic under test is compared to the encoding of each reference network spectral that may be a match candidate to the test traffic. As the pattern matching proceeds, the packet analyzer's confidence in the degree of match typically varies, typically with respect to some defined confidence interval. More formally, the confidence interval is a number of consecutive positive comparisons across matching intervals that serve to qualify or affirm a threshold likelihood of comparison against an IoC as depicted in the reference network spectral collection interval. Typically, this number is a property of the reference network spectral, perhaps based partially upon a confidence in the accuracy of the IoC depicted by the reference network spectral; in an alternative embodiment, the number is adjusted through a system- or user-preference, based on external or other factors (e.g., time-of-day, source or destination IP address, etc.).

As noted above, in one embodiment what is being matched depends on the encoding implementation but typically includes: ports, byte counts, packet counts, and the sequencing of <byte count, packet count> paired observations over the course of the matching interval. Any of a number of factors, however, can cause a reference spectral match to deviate across match points, thereby potentially impacting the analysis. These factors include, for example, changes in port for a pattern potentially matching a spectral in all other regards (particularly, for any ports>1024), changes in packet payload volume owing to variability of arguments within, and others. As an example, a phishing Indicator of Compromise (IoC) match might contain a HTTP redirect with a 78-byte destination URL in the reference, but with a 112-byte match in the observed traffic (perhaps due to a dynamic change in the hosting for a Command and Control (C&C) center orchestrating the phishing offense). To address these types of errors, preferably the network spectral analyzer derives and maintains an additional confidence interval weighting, as is now described.

In particular, at any point that the analyzer deems a match in a reference spectral, preferably the analyzer records the following state information (constituting some member of M or M' as illustrated above): (i) an identification of the network spectral under consideration, (ii) a mapping of endpoint identities as observed in the traffic versus the ones depicted in the network spectral, (iii) an offset into the match that has been done successfully to that point, and (iv) a remaining confidence matching interval balance. The second item (ii) is retained the spectral can pertain to any two IP addresses, and not just the ones which were observed in the reference network spectral. The third item (iii) denotes that each match starts with a "reserve" of confidence that can be decremented across a given match. As an example, assume an arbitrary 100 points of confidence. A mismatch between ports>1024 may be a negligible decrement from that balance, e.g., 1 point. A mismatch between ports<1024, however, may be a more serious deviation from the reference, e.g., 10 points. A change in size between two expected packets in match sequence might be variably-weighted on a defined deviation scope, e.g., $[+(s_{ref}-s_{eval})/s_{ref}]$ points decremented on the overall match. As another example, exhaustion of the reference match space (e.g., transport connection) with a significant amount left over on the evaluation match space transport connection could be weighted to very quickly exhaust the confidence points on a match. These are merely representative examples.

By applying confidence interval weighting such as described above, the spectral comparison component of the analyzer can quickly identify mismatches between the spectral for the traffic segment being evaluated and the set of reference network spectrals. In particular, the lack of viability for a given reference network spectral can be quickly determined, leaving all but the reference network spectral candidates that have some probability of matching.

Although not required, it may be desirable to constrain the match space under consideration, e.g., by network level protocol boundaries.

Forming the Network Spectral

The form and encoding of the network spectral preferably takes on another interval value, referred to as above as the encoding interval. As described, the encoding interval constitutes the smallest point for a given spectral for which traffic volume can be identified and assessed for a given actor in the underlying network activity which the spectral models and depicts. Preferably, and during encoding of the network spectral (e.g., by converter component 704 in FIG. 7), the system declares this value to ensure that confidence intervals in any matching process for any given comparison traffic measurement are adjusted appropriately. As described below, the encoding interval also enables the system to adjust the traffic measurement to match that of the network spectral. Preferably, the network spectral with the smallest encoding interval (and therefore encoded with the most potential sample values) provides the most entropic network traffic pattern underlying the specific network spectral measurement.

Spectral Pattern Matching

As noted above, the encoding (of both the test traffic and each reference) facilitates comparison of observed network traffic to the reference network spectral(s)). In FIG. 7, and as described above, this comparison is implemented by the comparison component 708. In practice, this comparison typically involves matching and tuning of the per-encoding interval measurements to match those in the traffic pattern under comparison. This is because for the pattern matching to be effective, it is assumed that such dissimilarity in interval boundary divisions is the rule, and not the exception. Accordingly, to facilitate efficient pattern matching, preferably several additional operations are carried out; these include initial smoothing, and interpolation. Smoothing is carried out to diffuse closely-related traffic spikes; this operation processes the data, e.g., using a Fourier analysis, to convert a series of spikes into more of a continuous waveform. The degree of smoothing (or smoothing tolerance) may vary, e.g., and preferably it is a system- or user-configurable parameter. Interpolation refers to a process to provide a statistically linear and discrete input to the smoothing process. Interpolation and smoothing preferably are implemented so that interval sections at issue are first matched across the reference spectral and the packet flow/capture under comparison. The matching itself then becomes a conventional search, albeit with interpolated per-encoding-interval-bound match cells. FIG. 8 depicts a representative pseudocode listing for a stream-based pattern matching algorithm according to this approach.

Spectral Reporting

As noted above, and as depicted in FIG. 7, and as the stream-based matching proceeds, the spectral analyzer provides an output representing a match (of a given reference network spectral) on the traffic under test. A straightforward match enables a simple (match (spectral, binary)) outcome (e.g., output 710 in FIG. 7). As noted, preferably the pattern matching is carried out in near real-time on a continuous basis with respect to the traffic under analysis; as such, the encoding of the traffic itself is dynamic (as more data is received). Thus, as the traffic under test is compared with the reference network spectrals, the degree of match typically varies continuously (as more data is received), thereby causing various of the reference spectrals to fall away (as not matching). At some point the pattern match returns a response, typically at least one match, and this match then represents the system's best characterization of the traffic under test. This final result may then be used for other purposes depending on implementation. As one example, the output of the comparison may be used to trigger a higher level threat reporting processing, to a SIEM, IPS processing, or the like. In addition, the spectral pattern matching algorithm (FIG. 8) may be enhanced for more than a match/no-match outcome. In this manner, more versatile or fine-grained IoC analytics are enabled.

For example, there are a number of points where entropic conditions of the network sampling may introduce perturbations that can then have their tolerance conveyed by a cumulative allowable confidence interval. More formally, a network spectral may have an associated measurement entropy. An entropy calculation typically is measured across a collection interval that is present in the reference network spectral. A greatly-divergent entropy value provides the system with an immediate indication of a negative comparison, thereby enabling the system to reject the reference network spectral as a match without having to spend processing cycles on more compute-intensive processes in the comparison across the collection interval, and also potentially obviating computing of encoding intervals.

Entropy calculation may proceed as follows. An additional match_interval function (within the comparison component 708) takes a given confidence interval and adjusts it during match processing. To this end, a "compare spectral against next measure" codeline (in FIG. 8) measures that cumulative interval against a configured (or per-spectral) high water mark. This operation then approximates a "conditional entropy" value as follows:

$$H(Y \vert X) = \Sigma_{(x \in X)} \Sigma_{(y \in Y)} p(x,y) \log(p(y \vert x)).$$

Stated another way, partial matches generated the spectral comparison may have their own matching metrics to convey. These metrics may also be of interest, particularly for pattern spaces of high interpolation and native entropy. Those entropic measurements can also be given as an input to the spectral analyzer to enable the analyzer to calculate "maximum" entropic deviation tolerable in determination of a match. One application of this type of spectral reporting includes, without limitation, detection of anomalies within the comparison space of the network spectral encoding interval boundaries themselves.

Figure 9:
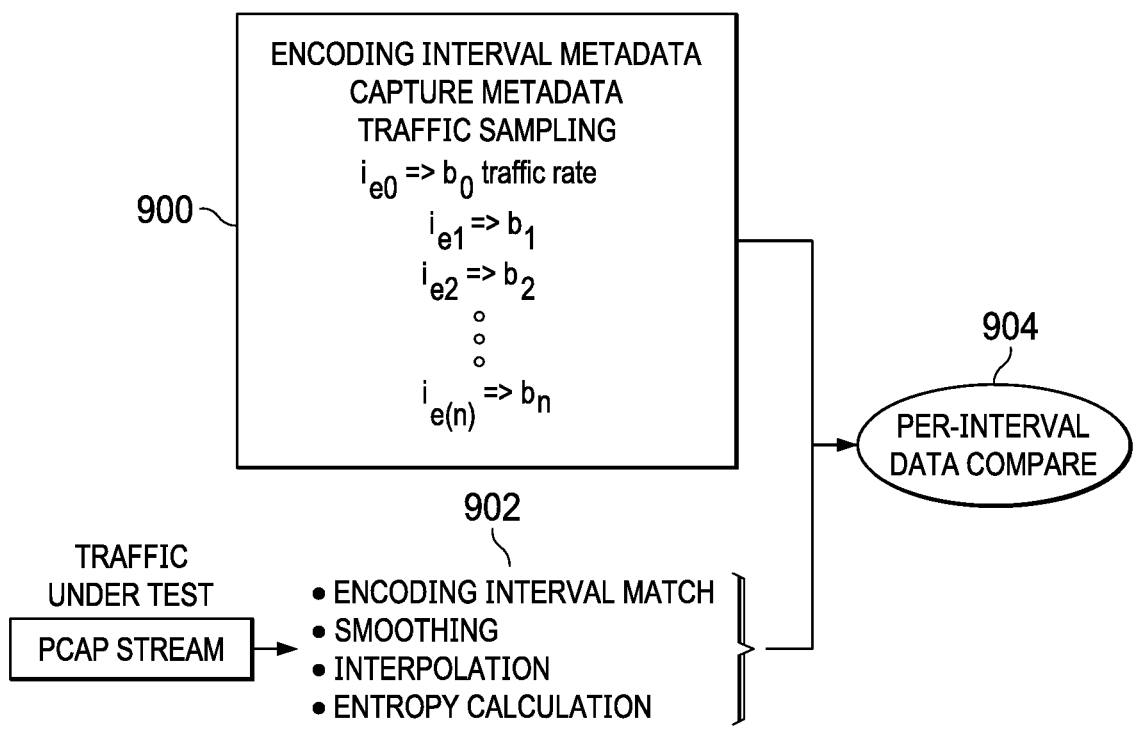
FIG. 9 is a more detail example of the network spectral analysis technique shown in FIG. 7.

The following provides additional details regarding an implementation of the network spectral analyzer according to an example embodiment. As noted above, and with reference now to FIG. 9, the network spectral analyzer takes a reference network spectral 900 as one input, and the output 902 of the PCAP spectral converter component, and performs a comparison. As depicted, preferably the reference spectral component performs encoding interval matching, smoothing, interpolation (outlier reduction), and entropy deviation (e.g., perfect match=0; complete dissimilarity=1) calculation, all as described above. The smoothing and interpolation are optional. The end result 904 provides a degree of overlap between the captured traffic and reference network spectral, optionally together with notation and duration of any exact overlap that has been identified by the comparison.

Smoothing, interpolation and entropy calculation (occur during match), preferably on a per encoding interval.

Building Reference Spectral Library

Given the format of the persisted network spectral (e.g., from a pcap-converted spectral), the following describes a utility that may be used to create the library of reference spectrals 702 as shown in FIG. 7. As noted there, the analyzer may store the library natively, or it may access the library from an external repository or any other data source. The library may be updated periodically or upon receipt of new reference network spectrals. In one implementation (e.g., involving PCAP data streams), the utility takes a pcap file name and an output network spectral file name. This utility then performs several functions. In particular, it evaluates the interfame gaps in a data stream to infer an optimally usable encoding interval. The utility then adjusts that interval, e.g., based on any user override (although unattended operation is also supported, e.g., for automated testing applications), and encodes the spectral intervals and frame levels based upon the encoding interval, including any necessary smoothing, interpolation, and other functions to enable interval-bounded traffic level reporting. During this process, the utility may also provide other spectral metadata such as entropy reporting. According to a further aspect of this disclosure, preferably the utility also provides an additional encoding option for the spectral that is referred to herein as soft-axis.

Preferably, the system has an available library of network spectrals that are built based on measurement of determined or simulated attack traffic. Network spectrals may be provided from a trusted third party source, e.g., via a security community distribution model.

An alternative encoding approach to generating a reference spectral may be based on recorded per-packet flow data, e.g., in IPFIX and OASIS STIX. For IPFIX, the per interval exchange can be encoded using basic list template structures (as defined in RFC 6313). The basic per-interval conveyance (where intervals here are defined by the IPFIX exporter reporting intervals) emits a report conforming to an overall metadata template, and then n list elements where n=number of sampling intervals within the IPFIX reporting interval. STIX makes use of similar mechanisms, as defined by the multi-element list structures in Volume 5 of the 2.0 STIX standard.

Soft Axis Time-Series Compression

As noted above, preferably a reference network spectral is encoded in a highly-compact manner (so as to facilitate the pattern matching) by processing the encoding to ignore or omit intervals in which traffic is idle (non-varying). When traffic is idle (non-varying) during one or more intervals being encoded into the network spectral, preferably time-series compression is utilized to reduce the amount of data encoded, thereby providing a more compact representation. The process is sometimes referred to herein as using soft-axis encoding. This encoding ensures that a traffic pattern under analysis cannot evade detection as a result of ambient impacts (to the flow) resulting from idle traffic conditions, namely, idle activity that does not otherwise represent meaningful traffic. The nature and cause of the idle activity may vary but typically includes interframe gaps, application protocol activity such as keep-alives across intervals, and the like. These real-world conditions can adversely affect the cross-interval presence of measurements of value that are otherwise useful in profiling the IoC represented by a network spectral, and the soft-axis approach removes this activity from the encoding.

Figure 10:
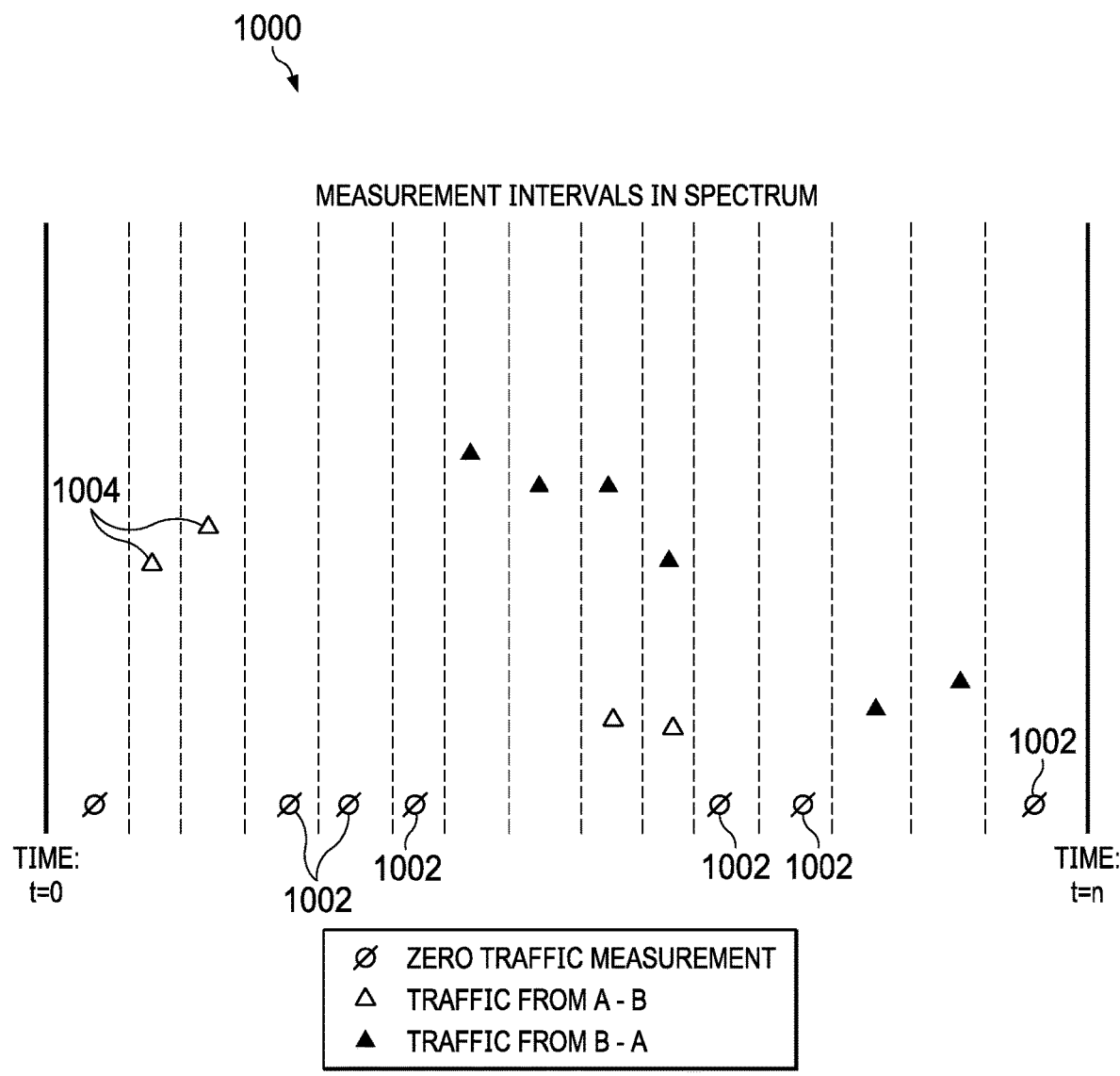
FIG. 10 is an example network spectral that is processed using a soft-axis time-series compression to account for variability in zero-volume (non-entropic) encoding intervals that might otherwise impact the accuracy of the spectral.

For a typical IoC, a representative network spectral comprises some number of nonzero measurements of traffic level going from one party to the other, and intervals representing zero traffic levels in either direction. These zero traffic levels can represent processing and microservice startup times on the part of a spectral participant, or they can represent transmission latencies, particularly across long transmission fabrics where the sampling interval is fine-grained. Soft-axis comparison and encoding as described herein reduces false negatives that might otherwise result from these intra-nonzero-measurement gaps. With reference now to FIG. 10, in this simplified depiction of a network spectral 1000, there are several zero measurement intervals 1002. In this two-party, bi-directional traffic pattern, the dotted triangles 1004 represent traffic from A→B, and the solid triangles represent traffic from B→A. Although it is possible to effectively match the spectral pattern of the actual traffic measurement levels at either endpoint of the flow, these values typically remain relatively constant with respect to both the reference spectral and the measured captured traffic (exhibiting the IoC associated with that spectral). The confidence in that measurement (if not the overall ability to match to the spectral), however, may be adversely affected by the presence of some defined sequence (e.g. greater than 2) of zero measurement intervals, whose presence causes inaccuracies in the traffic captured, e.g., due to transient conditions in system processing or network latency. To address this, soft-axis encoding provides for a time-series compression along non-varying (idle traffic) encoding intervals. This compression may be used whenever and wherever the spectral includes a given sequence of zero measurement intervals, but a preferred approach is to configure the compression more selectively depending on the nature of the traffic flow and the conditions that may impair the accuracy of the representation. For example, compression of the zero measurement intervals may be controlled by a regular expression matching elements that tests for the existence of one or more conditions, such as transport vagaries (e.g., keep-alives), interframe graps, and the like, that may impair the measurement accuracy. To provide a concrete example, a regular expression may implement a "match one or more" type of regular expression matching element; upon a match, the time-series compression is implemented for the sequence of zero measurement intervals. This encoding is advantageous as it accounts for variability in zero-volume (non-entropic) encoding intervals.

Generalizing, soft-axis (time-series) encoding provides a mechanism to filter (from the encoding) measurements that do not represent meaningful traffic data useful for comparison purposes.

Multi-Party, Multi-Directional Network Traffic Patterns

Figure 11:
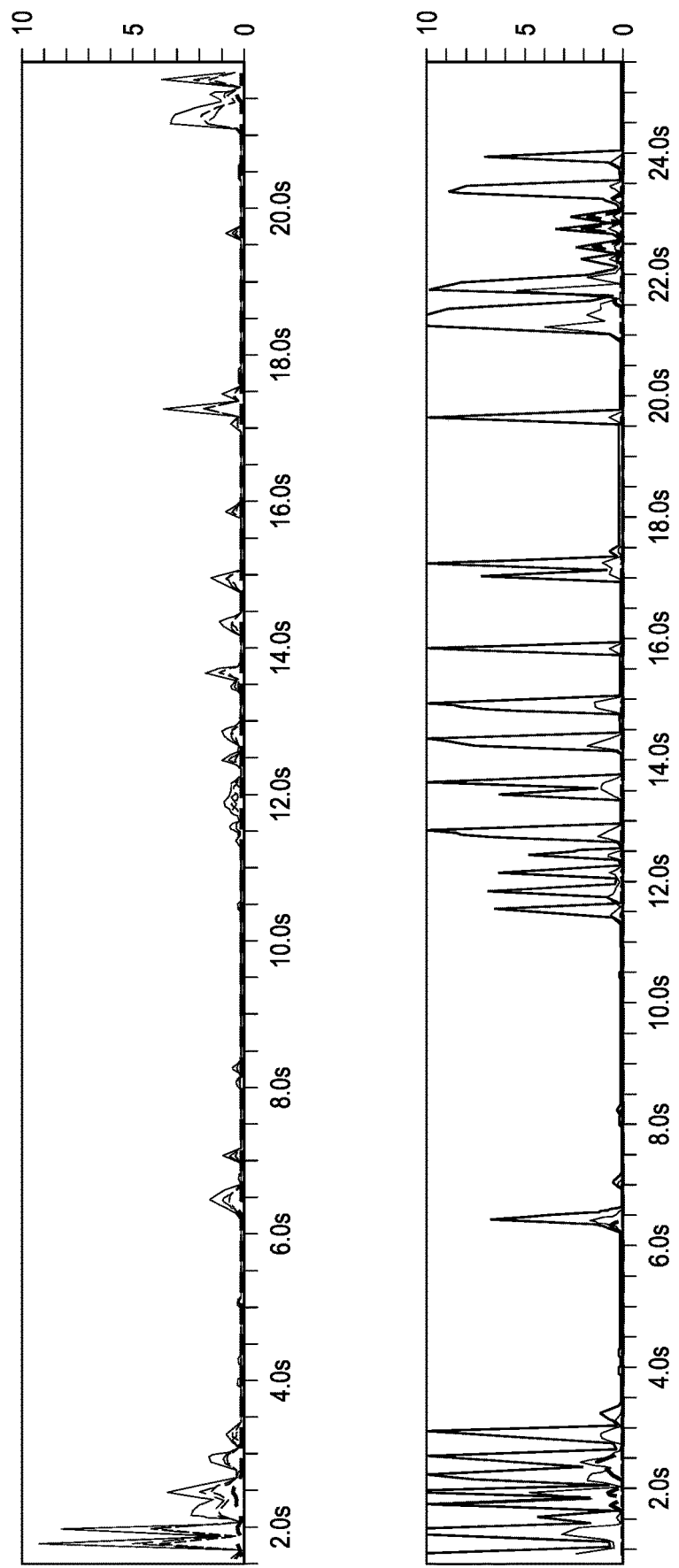
FIG. 11 depicts a representative multi-party operating scenario in which the techniques of this disclosure also may be implemented.

The techniques as described above enable the formulation and use of bi-directional network patterns between entities. FIGS. 5 and 6 represent typical two-party flows. According to a further aspect, the techniques herein also are readily applied to multi-directional traffic patterns, including those involving multiple parties. This is desirable because not all IoCs match the two-party (e.g., client-server) paradigm. This is depicted by way of example in FIG. 11, which depicts a multi-party scenario showing a pair of traffic patterns and bytes, corresponding to a primary client sender and several peers exchanging data using TOR (The Onion Router) across its peer-routing fabric. This use case is not intended to be limiting. The ultimate destination, once identified and anonymized, is not otherwise visible. In this scenario, there are several actors in the exchange. In comparing the two plots, it can be seen that the very presence of this peering set within a short interval gives some indication of matching to a reference spectral, but the identity of those peers, for purposes of matching, needs to be abstracted and matched on a given evaluation candidate, e.g., where a given set of peering actors a . . . e, are mapped to an emerging identity IP address for a given spectral. In the case a spectral to be matched is generated from a placement on a public IP address space versus, say, an evaluation candidate behind a NAT firewall, the matching (in this case b . . . e→a single IP) is more robust and leaves multiple matching options open without significant decrement of the confidence matching interval.

Generalizing, the techniques herein may be generalized to facilitate multi-party network spectral comparison. Preferably, comparison are carried out using the above-described functionality, and as necessary evaluating the traffic flows from each pair of entities (e.g., [a,b] . . . [b,c] . . . [a.c]) that comprise the flow in question. In this manner, the approach herein enables detection of patterns for forwarding proxies, man-in-the-middle translation, and other peer-relationship forwarding or data serving protocols (such as BitTorrent).

Mitigation and Remediation

As has been described, the techniques herein enable fast and efficient characterization of data network threats and attacks. As has been described, the basic use case attempts to match (via the network spectrals) a network state against a set of characterized and recognizable threats. Based on such matching, the system outputs information that is then useful to initiate or control some mitigation or remediation of the threat. The nature of the mitigation or remediation may vary depending on the severity of the threat, the degree of the match, some external factor (e.g., time-of-day, attack target, etc.), or some other consideration that may defined in a security policy. A representative mitigation or remediation action may be updating a firewall block, dropping a connection, sandboxing a connection, issuing an alarm, logging, or providing a control signal or other indication to another security device, application or system.

The techniques herein provide significant advantages. As has been described, the techniques herein enable fast and efficient characterization of data network threats and attacks. Foremost, the technique provides for the generation and use of network spectrals against which bi- and multi-directional network traffic patterns may be analyzed and characterized. The approach enables a network spectral analyzer to provide real-time or near real-time pattern analysis of traffic based on the data encoded in a reference spectral, such data including volume, direction, and non-encrypted traffic metadata (e.g., TCP protocol and port equivalencies) and employing non-encrypted patterns based upon, e.g., connection establishment and tear-down signatures for connections transmitting those patterns across the underlying IP fabric. The techniques herein enable real-time comparison of those traffic patterns relative to reference patterns that represent the occurrence of network threats or other high-value events of the network for purposes of security. The approach herein (in particular, the notion of "soft axis") ensures that the reference spectral comparison is robust and accurate where the traffic under test might be otherwise adversely affected by ambient network conditions such as interframe gap, application protocol keep-alive activity across intervals, and the like. The approach is also readily scalable to model multiparty (p>2), thereby enabling the system to detect complex patterns of forwarding proxies, man-in-the-middle translation entities, and other peer-relationship forwarding or data serving scenarios.

Without intending to be limiting, the approach herein may be used in association with other network flow monitoring and packet analysis techniques. The network spectral analyzer of this disclosure may be implemented in various way, and it may be configured on-premises, network-based or cloud-based.

This subject matter of the network spectral analyzer may be implemented as-a-service. The subject matter also may be implemented within or in association with a data center that provides cloud-based computing, data storage or related services in association with other network security products and services. Each of the spectral generator utility (used to build reference spectrals) and the spectral analyzer functionality (used to perform real-time fast identification and analysis) may be provided as standalone functions, or each may leverage functionality from other products and services including, without limitation, any other security monitoring and analysis system, products, device, program or process.

In a typical use case, a SIEM or other security system has associated therewith an interface that can be used to render the data flow information visually, to search and retrieve relevant information from an alert or other database, and to perform other known input and output functions with respect thereto.

As noted above, the approach herein is designed to be implemented in an automated manner within or in association with a security system, such as a SIEM, a cybersecurity analytics platform, or otherwise.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

The notion of "real-time" or "near real-time" as used herein is not meant to require any absolute time relative to a given clock value; rather, "real-time" may be relative. In connection with the spectral pattern matching as described, real-time refers to the match process being carried out as the traffic under test is received and encoded. As noted, and as the encoding is proceeding, the traffic is being matched to the reference spectrals. This pattern matching of a stream of data (the traffic under test) occurs in real-time or near real-time.

Having described the subject matter, what we claim is as follows:

1. A method to identify threats on a TCP/IP-based network, comprising:
   obtaining a set of reference patterns associated with one or more defined Indicators of Compromise (IoCs), wherein a reference pattern is an encoding of a packet capture and includes a set of interval-bound traffic measurements for each pairing of one or more addressable network interfaces in the packet capture, together with any other detectable session data that is at least one of: traffic volume, directional data, and non-encrypted traffic metadata associated with a transport connection;
   receiving, as a data stream, network traffic data associated with a traffic pattern;
   encoding the received network traffic to generate a network spectral;
   as the data stream is received, real-time pattern matching the network spectral against a set of reference patterns that include the reference pattern; and
   responsive to identifying a match between the network spectral and at least one of the set of reference patterns, taking a given remediation or mitigation action.

2. The method as described in claim 1 wherein real-time pattern matching includes:
   identifying each of the set of reference patterns as a match to the network spectral;

as a confidence for a match between the network spectral and a given reference pattern declines below a configurable threshold, removing the given reference pattern from further consideration.

3. The method as described in claim 1 wherein the at least one reference pattern is generated by encoding the packet capture and filtering one or more time-bounded intervals that exhibit idle traffic activity.

4. The method as described in claim 1 wherein the one or more addressable network interfaces are associated with at least two (2) distinct computing entities.

5. The method as described in claim 4 wherein the at least one reference pattern is a multi-directional traffic pattern involving more than two (2) distinct computing entities.

6. The method as described in claim 1 wherein the received network traffic data is one of: captured packet traffic, and data derived from live captured traffic.

7. An apparatus, comprising:
a processor;
computer memory holding computer program instructions executed by the processor to identify threats on a TCP/IP-based network, the computer program instructions including program code configured to:
obtain a set of reference patterns associated with one or more defined Indicators of Compromise (IoCs), wherein a reference pattern is an encoding of a packet capture and includes a set of interval-bound traffic measurements for each pairing of one or more addressable network interfaces in the packet capture, together with any other detectable session data that is at least one of: traffic volume, directional data, and non-encrypted traffic metadata associated with a transport connection;
receive, as a data stream, network traffic data associated with a traffic pattern;
encode the received network traffic to generate a network spectral;
as the data stream is received, real-time pattern match the network spectral against a set of reference patterns that include the reference pattern; and
responsive to identifying a match between the network spectral and at least one of the set of reference patterns, take a given remediation or mitigation action.

8. The apparatus as described in claim 7 wherein the computer program instructions for the real-time pattern match includes program code further configured to:
identify each of the set of reference patterns as a match to the network spectral;
as a confidence for a match between the network spectral and a given reference pattern declines below a configurable threshold, remove the given reference pattern from further consideration.

9. The apparatus as described in claim 7 wherein the at least one reference pattern is generated by encoding the packet capture and filtering one or more time-bounded intervals that exhibit idle traffic activity.

10. The apparatus as described in claim 7 wherein the one or more addressable network interfaces are associated with at least two (2) distinct computing entities.

11. The apparatus as described in claim 10 wherein the at least one reference pattern is a multi-directional traffic pattern involving more than two (2) distinct computing entities.

12. The apparatus as described in claim 7 wherein the received network traffic data is one of: captured packet traffic, and data derived from live captured traffic.

13. A computer program product in a non-transitory computer readable medium for use in a data processing system to identify threats on a TCP/IP-based network, the computer program product holding computer program instructions that, when executed by the data processing system, are configured to:
obtain a set of reference patterns associated with one or more defined Indicators of Compromise (IoCs), wherein a reference pattern is an encoding of a packet capture and includes a set of interval-bound traffic measurements for each pairing of one or more addressable network interfaces in the packet capture, together with any other detectable session data that is at least one of: traffic volume, directional data, and non-encrypted traffic metadata associated with a transport connection;
receive, as a data stream, network traffic data associated with a traffic pattern;
encode the received network traffic to generate a network spectral;
as the data stream is received, real-time pattern match the network spectral against a set of reference patterns that include the reference pattern; and
responsive to identifying a match between the network spectral and at least one of the set of reference patterns, take a given remediation or mitigation action.

14. The computer program product as described in claim 13 wherein the computer program instructions for the real-time pattern match includes program code further configured to:
identify each of the set of reference patterns as a match to the network spectral;
as a confidence for a match between the network spectral and a given reference pattern declines below a configurable threshold, remove the given reference pattern from further consideration.

15. The computer program product as described in claim 13 wherein the at least one reference pattern is generated by encoding the packet capture and filtering one or more time-bounded intervals that exhibit idle traffic activity.

16. The computer program product as described in claim 13 wherein the one or more addressable network interfaces are associated with at least two (2) distinct computing entities.

17. The computer program product as described in claim 16 wherein the at least one reference pattern is a multi-directional traffic pattern involving more than two (2) distinct computing entities.

18. The computer program product as described in claim 13 wherein the received network traffic data is one of: captured packet traffic, and data derived from live captured traffic.

19. A network threat detection system, comprising:
a first software-based utility executed on hardware and configured to obtain a packet capture and generate a first network spectral encoding, the first network spectral encoding including a set of interval-bound traffic measurements for each pairing of one or more addressable network interfaces in the packet capture, together with any other detectable session data; and
a second software-based utility executed on hardware and configured to receive a data stream, and, as the data stream is received, to real-time pattern match a network spectral encoding of the received data stream against a set of network spectral encodings that include the first network spectral encoding; and a third software-based utility executed on hardware and configured to respond to a pattern match between the network spectral encoding of the received data stream and a given one of the set of network spectral encodings to take a given mitigation or remediation action.

* * * * *